United States Patent
Sakoda

(10) Patent No.: US 6,456,669 B1
(45) Date of Patent: Sep. 24, 2002

(54) DATA COMMUNICATION METHOD, TRANSMITTER, AND CELLULAR RADIO COMMUNICATION SYSTEM

(75) Inventor: Kazuyuki Sakoda, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/178,163

(22) Filed: Oct. 23, 1998

(30) Foreign Application Priority Data

Oct. 31, 1997 (JP) .............................................. 9-301341

(51) Int. Cl.⁷ .......................... H04L 27/10; H04L 5/12; H04L 23/02; H04L 25/06; H04L 25/10
(52) U.S. Cl. ........................ 375/283; 375/260; 375/317
(58) Field of Search ................................ 375/283, 260, 375/317

(56) References Cited

U.S. PATENT DOCUMENTS

| | | | | |
|---|---|---|---|---|
| 3,845,390 A | * | 10/1974 | De Jager et al. ............ 375/231 |
| 4,943,980 A | * | 7/1990 | Dobson et al. ............. 375/269 |
| 5,172,070 A | | 12/1992 | Hiraiwa et al. ............. 329/304 |
| 5,261,120 A | | 11/1993 | Suzuki et al. ................. 455/63 |
| 5,444,697 A | * | 8/1995 | Leung et al. ................ 370/207 |
| 5,471,464 A | * | 11/1995 | Ikeda ......................... 370/203 |
| 5,519,730 A | * | 5/1996 | Jasper et al. ................ 375/260 |
| 5,771,224 A | * | 6/1998 | Seki et al. .................. 370/206 |
| 5,907,583 A | * | 5/1999 | Sakoda et al. ............. 375/260 |
| 6,169,768 B1 | * | 1/2001 | Okada et al. ............... 375/316 |

* cited by examiner

Primary Examiner—Chi Pham
Assistant Examiner—Tony Al-Beshrawi
(74) Attorney, Agent, or Firm—Oblon, Spivak, McClelland, Maier & Neustadt, P.C.

(57) ABSTRACT

The present invention makes it possible to transmit data while reducing the influence of fading caused on a transmission path. When communication data is transmitted by using a plurality of subcarriers arranged with a predetermined bandwidth, a data block consisting of a plurality of subcarriers arranged in rows in a time axis direction is used as a data unit. By implementing both a differential modulation process based on each phase difference in the frequency axis direction between a plurality of subcarriers and a differential modulation process based on each phase difference in the time axis direction between a plurality of subcarriers, a transmission signal with symbol data superposed on each phase difference between a plurality of subcarriers is generated and output.

15 Claims, 10 Drawing Sheets

DATA COMMUNICATION METHOD, TRANSMITTER, AND CELLULAR RADIO COMMUNICATION SYSTEM

BACKGROUND OF THE INVENTION

1. Field of the Invention

This invention relates to data communication methods, transmitters, and cellular radio communication systems, and more particularly, is suitable for use in a radio communication system such as a portable telephone system.

2. Description of the Related Art

In this kind of radio communication system, an area providing communication services is segmented into cells with a predetermined size. Base stations as stationary radio stations are deployed within the cells, respectively.

A portable telephone as a mobile radio station can communicate with the base station within the cell where the portable telephone exists. Thus, a so-called cellular system is constructed. For the cellular system, various systems have been proposed as the communication system between a portable telephone and a base station. As the representative one, there is a time division multiple access (TDMA) system.

In this TDMA system, as shown in FIGS. 1A and 1B, a predetermined frequency channel is segmented temporally into frames (F0, F1, . . . ) each having a predetermined time interval. Each frame is further divided into time slots TS0 to TS3, each time slot has a predetermined time interval. At the timing of time slot TS0 allocated to a user, the user uses the time slot to transmit a transmission signal. This system realizes a plurality of communications (so-called multiplex communication) by the same frequency channel and therefore utilizes frequency efficiently. Note that in the following description, time slot TS0 allocated for transmission is called transmission slot TX, while a block of data (i.e., data unit) that is sent with one transmission slot TX is called a slot.

Here, the transmitter and receiver of a radio communication system to transmit and receive data by taking an advantage of this TDMA system will be described with FIGS. 2 and 3. Incidentally, the transmitter and receiver shown in FIGS. 2 and 3 are mounted, for example, in the portable telephone and base station of a portable telephone system, respectively. The transmitter and the receiver are used in the communication from a portable telephone to a base station (so-called uplink communication) and the communication from a base station to a portable telephone (so-called downlink communication).

As shown in FIG. 2, the transmitter 1 is roughly constituted by a convolution coding circuit 2, an interleave buffer 3, a segmenting circuit 4, a modulation circuit 5, a pilot symbol adding circuit 6, a transmitting circuit 7, and an antenna 8. A data bit series S1 (transmission data) is first input to the convolution coding circuit 2.

The convolution coding circuit 2 consists of a predetermined stage-number of shift registers and exclusive OR circuits. The convolution coding circuit 2 performs convolution coding on the input data bit series S1 and then outputs the resulting coded bit series S2 to the interleave buffer 3. The interleave buffer 3 stores the coded bit series S2 in its internal storage region in order. If the coded bit series S2 is stored in the entire storage region (i.e., if the coded bit series S2 is accumulated by a desired amount), then the order of the coded bit series S2 will be randomly rearranged (rearranging this order will hereinafter be referred to as interleaving). The resulting coded bit series S3 is output to the segmenting circuit 4. Incidentally, the interleave buffer 3 has a storage capacity equivalent to a plurality of slots so that the coded bit series S3 is dispersed to a plurality of transmission slots TX.

The segmenting circuit 4 segments the coded bit series S3 at intervals of a predetermined number of bits in order to allocate the coded bit series S3 to transmission slots TX. The resulting coded bit group S4 is output to the modulation circuit 5 in order. The modulation circuit 5 performs a predetermined modulation process (e.g., a modulation process in a synchronous detection system such as QPSK modulation) on the supplied coded bit group S4 and then outputs the resulting data symbol group S5 to the pilot symbol adding circuit 6.

As shown in FIG. 4, the pilot symbol adding circuit 6 adds pilot symbols P as a header at the head of each symbol group (i.e., the head of data symbol I) of the data symbol group S5 segmented according to the transmission slots TX, and then outputs the resulting transmission group S6 to the transmitting circuit 7. Incidentally, the pilot symbols P added here are a known symbol pattern that has previously been known at the receiver side, and at the receiver side these pilot symbols P are employed to estimate the characteristics of the transmission path (e.g., fading, etc.).

The transmitting circuit 7 performs a filtering process on the transmission symbol group S6 added with these pilot symbols P in sequence and then performs a digital-to-analog conversion process on the transmission symbol group S6 to generate a transmission signal. And the transmitting circuit 7 performs a frequency transformation on the transmission signal, thereby generating a transmission signal S7 having a predetermined frequency channel. After this signal has been amplified to a predetermined electric power, it is transmitted through the antenna 8. In this manner, the transmission signal S7 is transmitted from the transmitter 1 in synchronization with the timing of the transmission slots TX.

On the other hand, as shown in FIG. 3, the receiver 10 is roughly constituted by an antenna 11, a receiving circuit 12, a transmission path estimating circuit 13, a demodulation circuit 14, a slot coupling circuit 15, a deinterleave buffer 16, and a Viterbi decoding circuit 17. The transmission signal S7 transmitted from the transmitter 1 is received by the antenna 11, and this is input to the receiving circuit 12 as a received signal S11.

The receiving circuit 12 amplifies the input received signal S11 and then performs a frequency transformation on the received signal S11, thereby taking out a base band signal. The receiving circuit 12 performs a filtering process on the base band signal and then performs an analog-to-digital. conversion process on the base band signal, thereby taking out a received symbol group S12 corresponding to the transmission symbol group S6. The received symbol group S12 is output to the transmission path estimating circuit 13.

The transmission path estimating circuit 13 is one which investigates the characteristic of the transmission path and also performs an equivalent process according to the result of investigation. The transmission path estimating circuit 13 estimates the characteristic of the transmission path by making a reference to the pilot symbols P included in the received symbol group S12, and computes the inverted characteristic of the transmission path, based on the result of estimation. And the transmission path estimating circuit 13 convolution-multiples a numerical value, which indicates the inverted characteristic of the transmission path, and each data symbol portion of the received symbol group S12, by using an equalizing circuit consisting of an equalizer. With this multiplication, the influence of fading caused on the transmission path is removed. With this process, the transmission path estimating circuit 13 restores the transmitted data symbol group 85 and outputs this to the modulation circuit 14 as a received data symbol group S13.

The modulation circuit 14 performs a predetermined modulation process on the received data symbol group S13, thereby restoring the coded bit group S14 corresponding to the coded bit group S4 on the transmitter side. The coded bit group S14 is output to the slot coupling circuit 15. Incidentally, each bit in the coded bit group S14 is not a binary signal such as a logic 0 or a logic 1 but has become a multi-level signal because of a noise component added on the transmission path.

The slot coupling circuit 15 is one which couples the group S14 of separate coded bits obtained in a slot unit so that they become a series signal. If the coded bit group S14 is accumulated by an amount corresponding to the storage capacity of the deinterleave buffer 16 of the latter stage, then the coded bit group S14 will be coupled together. The resulting code bit series S15 is output to the deinterleave buffer 16.

The deinterleave buffer 16 has a storage capacity equivalent to a plurality of slots. The deinterleave buffer 16 stores the supplied coded bit series S15 in its internal storage region in series and then rearrange the order of the coded bit series S15 in the order opposite the rearrangement made by the interleave buffer 3 of the transmitter 1, thereby returning the arrangement to the original order (such returning to the original order will hereinafter be referred to as deinterleaving). The resulting coded bit series S16 is output to the Viterbi decoding circuit 17.

The Viterbi decoding circuit 17 consists of a soft judgment Viterbi decoding circuit, and estimates a maximum likelihood state from among all state transitions that can be obtained as data (maximum likelihood estimation), by using the trellis diagram of the convolution codes based on the input coded bit series S16. With this estimation, the transmitted data bit series S18 is restored and output.

Incidentally, in radio communication systems with such constitution, in the case where the transmission signal S7, for example, is transmitted through a single frequency channel by the transmitter 1 and where the transmission signal S7 and waveforms delayed due to the multipath are simultaneously received by the receiver, the waveforms with time delay will overlap with the transmission signal S7, and consequently, frequency-selective fading will take place. Since this overlapped portion causes intersymbol interference, data cannot be accurately restored.

Hence, the receiver 10 takes an advantage of the fact that the symbols within each slot are temporally arranged and transmitted, and performs a convolution multiplication process on the time domain by an equalizing circuit consisting of an equalizer so that the influence of frequency-selective fading is removed. For this reason, there is a problem that the constitution of the receiver becomes complicated.

SUMMARY OF THE INVENTION

In view of the foregoing, an object of this invention is to provide a data communication method, a transmitter, and a cellular radio communication system which are capable of transmitting data while reducing the influence of fading caused on the transmission path.

The foregoing object and other objects of the invention have been achieved by the provision of a data transmitting method which transmits communication data by using a plurality of subcarriers arranged within a predetermined frequency width. In the data transmitting method, a data block consisting of the plurality of subcarriers arranged in rows in a time axis direction is used as a data unit when the communication data is transmitted, and both a differential modulation process based on each phase difference in a frequency axis direction between the plurality of subcarriers and a differential modulation process based on each phase difference in the time axis direction between the plurality of subcarriers are implemented, whereby a transmission signal that symbol data of the communication data are superposed on each phase difference between the plurality of subcarriers is generated and output.

Further, according to this invention, in a data receiving method which receives communication data transmitted by using a plurality of subcarriers arranged within a predetermined frequency width, a data block consisting of the plurality of subcarriers arranged in rows in a time axis direction is used as a data unit when the communication data is transmitted, and both a differential modulation process based on each phase difference in a frequency axis direction between the plurality of subcarriers and a differential modulation process based on each phase difference in the time axis direction between the plurality of subcarriers are implemented, whereby a transmission signal that symbol data of the communication data are superposed on each phase difference between the plurality of subcarriers is received. Differential demodulation processes based on each phase difference in the frequency axis, and time axis directions are implemented on the received signal, whereby the symbol data superposed on each phase difference between the plurality of subcarriers are demodulated and the communication data are restored.

Further, according to this invention, in a data transmitter which transmits communication data by using, a plurality of subcarriers arranged within a predetermined frequency width, modulating means, which uses a data block consisting of a plurality of subcarriers arranged in rows in a time axis direction as a data unit when the communication data is transmitted, for implementing both a differential modulation process based on each phase difference in a frequency axis direction between the plurality of subcarriers and a differential modulation process based on each phase difference in the time axis direction between the plurality of subcarriers, whereby a transmission signal that symbol data of the communication data are superposed on each phase difference between the plurality of subcarriers is generated. transmitting means for transmitting the transmission signal through a predetermined frequency channel.

Further, according to this invention, in a data receiver which receives communication data transmitted by using a plurality of subcarriers arranged within a predetermined frequency width, receiving means, which uses a data block consisting of the plurality of subcarriers arranged in rows in a time axis direction as a data unit when the communication data is transmitted, for implementing both a differential modulation process based on each phase difference in a frequency axis direction between the plurality of subcarriers and a differential modulation process based on each phase difference in the time axis direction between the plurality of subcarriers, whereby a transmission signal that symbol data of the communication data are superposed on each phase difference between the plurality of subcarriers is received. demodulating means for implementing differential demodulation processes based on each phase difference in the frequency axis and time axis directions on the received signal received by the receiving means, whereby the symbol data superposed on each phase difference between the plurality of subcarriers are demodulated and the communication data is restored.

Furthermore, in a cellular radio communication system, a predetermined area is segmented into cells with a predetermined size, then a base station is deployed in each of the cells, and a mobile station communicates communication data with the base station where that mobile station exists. At the mobile station, a data block consisting of a plurality of subcarriers arranged in rows in a time axis direction is used as a data unit when the communication data is transmitted, and both a differential modulation process based on each phase difference in the frequency axis direction between the plurality of subcarriers and a differential modulation process based on each phase difference in the time axis direction between the plurality of subcarriers are implemented, whereby a transmission signal that symbol data of the communication data are superposed on each phase difference between the plurality of subcarriers is generated and output. At the base station, the transmission signal is received, and differential demodulation processes in the frequency axis and time axis directions are implemented on the received signal, whereby the symbol data superposed on each phase difference between the plurality of subcarriers are demodulated and the communication data is restored.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Principle

In this embodiment, the basic principle of the data communication method in the portable telephone system of the present invention will first be described. In the present invention, transmission symbols, generated by coding a data bit series to be transmitted, are simultaneously transmitted by using a plurality of subcarriers. That is, communication is performed by using a multicarrier communication method.

Figure 5:
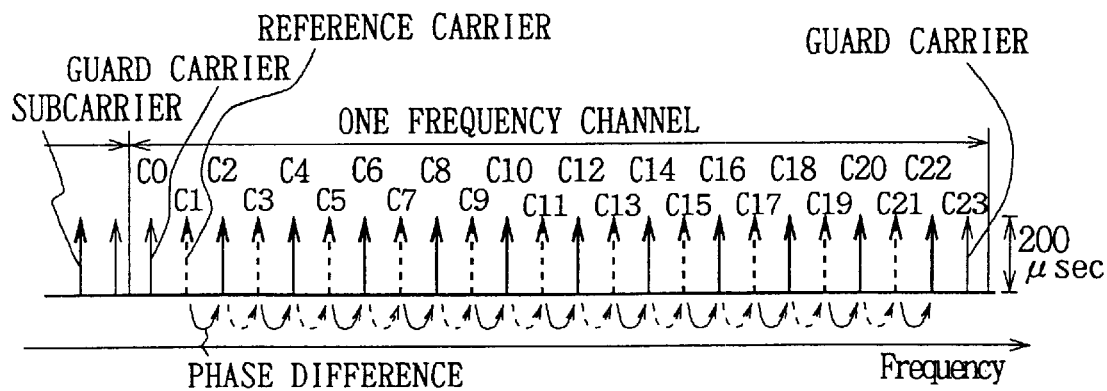
FIG. 5 is a diagram showing the constitution of a carrier according to an embodiment of the present invention.

Specifically, in the multicarrier communication method shown in FIG. 5, a single frequency channel is constituted, for example, by 24 subcarriers C0 to C23 arranged at regular intervals with a predetermined bandwidth on a frequency axis. Symbol data are superposed on the phase differences between 22 subcarriers C1 to C22 excluding the subcarriers C0 and C23 present as guard carriers on both ends of these 24 subcarriers C0 to C23, and transmitted.

In such a multicarrier communication method, in the case where one frame of voice data, for example, is transmitted, the transmitting side can transmit transmission symbols consisting of a coded data bit series simultaneously and in parallel by using a plurality of subcarriers C0 to C23. Therefore, there is no need to transmit one bit of data at high speed as in a TDMA system which transmits data by one carrier. Along with each subcarrier, symbol data can be transmitted at low speed (e.g., 200 $\mu$sec), so it becomes possible to narrow the bandwidth during transmission.

With this, even in the case where waveforms delayed by the multipath are received after the transmission signal transmitted from the transmitter side has been received directly, the receiving side is not influenced by the delayed waveforms as the delay time becomes shorter and shorter compared with 200 $\mu$sec of the transmission time, and consequently, intersymbol interference in the time axis direction can be prevented.

That is, compared with the TDMA system, the multicarrier communication method has the characteristic that the degree that it will undergo the influence of frequency-selective fading caused by delayed waveforms is low. In the present invention, a data bit series with a large amount of data, such as image data during data transmission, is converted to symbols and transmitted by the multicarrier communication method having such a characteristic.

Figure 6:
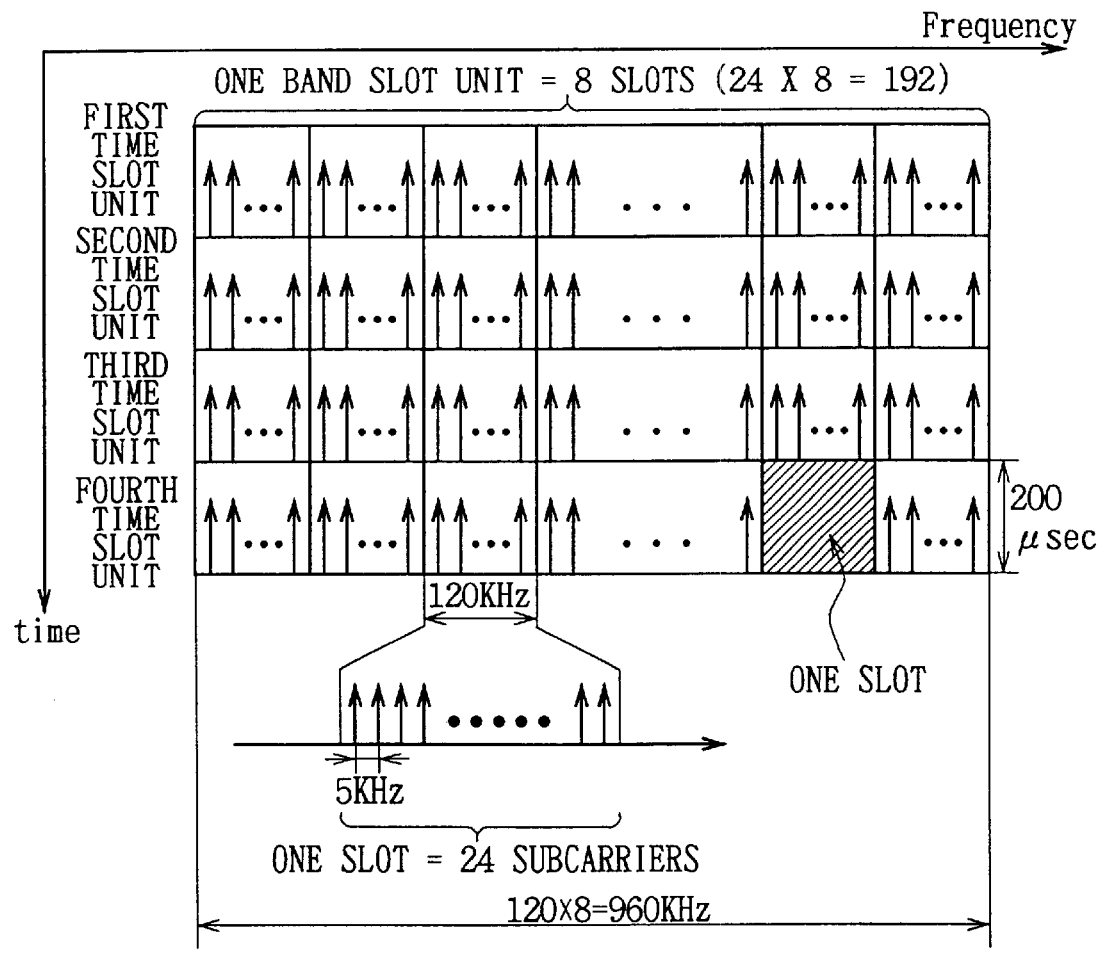
FIG. 6 is a diagram showing the constitution of a data block which is the data unit of communication data.

As shown in FIG. 6, in the data communication system of the present invention, in order to transmit a data bit series with a large amount of data such as image data, in actual fact a total of 192 subcarriers arranged in the frequency axis direction (hereinafter referred to as one band slot unit) are arranged in four rows in the time axis direction (these four rows will hereinafter be referred to as the first through the fourth time slot units), and these 192×4 subcarriers constitute a data block which is used as a data unit. Symbol data are superposed on the phase differences between the subcarriers in this data block.

In this case, the minimum unit constituting the data block is one slot consisting of twenty-four subcarriers arranged in the frequency axis direction, and one band slot unit is formed from eight slots. That is, since four time slot units are transmitted as a data block in the time axis direction, the entire data block is constituted by thirty-two slots (8 slots×4 time slot units). Note that when ordinary voice data are transmitted, the amount of data is small compared with image data and therefore multicarrier communication is performed in the unit of one slot which is the minimum unit of the data block.

Since the bandwidth between the subcarriers is 5 KHz, the bandwidth of the entire data block is 960 KHz. Therefore, if it is assumed that the bandwidth of the entire system is 30 MHz, the number of lines that can be simultaneously provided with users will be about 31 lines. Note that the transmission time in one time slot unit is 200 μsec.

Next, for the modulation method which superposes symbol data on each subcarrier of this data block, a description thereof will be made with FIG. 7. In the modulation method in this case, the leftmost subcarrier C0 of 192 subcarriers C0 to C191 in the first time slot unit is first employed as a reference carrier, and based on the phase difference between the subcarrier C0 and the subcarrier C1 adjacent right, symbol data are modulated. That is, a so-called differential modulation process in the frequency axis direction (lateral direction) is performed.

In this differential modulation process in the frequency axis direction, because of the frequency-selective fading that will arise when a delayed waveform with extremely long delay time caused by the multipath reaches the receiver side, phase rotation will occur differently for each subcarrier. Due to this, data degradation will arise; however, this modulation process is independent of the time axis direction and therefore has a characteristic which is robust to flat fading and frequency-selective fading that will occur due to variations in the time direction during high-speed movement.

Successively, in the modulation method of the present invention, symbol data are modulated based on the phase difference between adjacent subcarriers in the time axis direction (lateral direction) of 192 subcarriers C192 to C384 in the second time slot unit and 192 subcarriers C0 to C191 in the first time slot unit. That is, a so-called differential modulation process in the time axis direction is performed.

Likewise, for the third time slot unit and the four time slot unit, symbol data are modulated based on the phase difference between adjacent subcarriers in the time axis direction. This differential modulation process in the time axis direction is weak to the flat fading and frequency-selective fading which will occur due to time variations during high-speed movement, so data degradation will arise. However, since this process is a differential modulation in the time axis direction, data degradation will not occur when the moving speed is lower than the transmission time for one time slot unit or in the communication environment where there is no movement. In addition, the differential modulation process in the time axis direction is independent of the frequency axis direction and therefore has a characteristic that is robust to the flat fading and frequency-selective fading caused by delayed waveforms.

Therefore, in the communication environment where extremely high-speed movement is not performed, only the differential modulation process in the time axis direction may be performed on the entire data block. Also, in the communication environment where no delayed waveforms will occur, only the differential modulation process in the frequency axis direction may be performed on the entire data block. However, in the actual radio communication environment, the communication environment will usually change due to various factors, thus the aforementioned environments will not actually exist.

Therefore, in the communication system of the present invention, both the differential modulation process in the frequency axis direction and the differential modulation process in the time axis direction are performed at a ratio according to the communication environment where the portable telephone of the cellular system is used. With this, in the state in which data degradation arising on the transmission path has been reduced, transmission is performed. At the receiving side, as with the transmitting side, the differential modulation processes in the frequency axis and time axis directions are performed. With this, since the data degradation caused by the fading on the transmission path is reduced, data can be restored more accurately.

Figure 7:
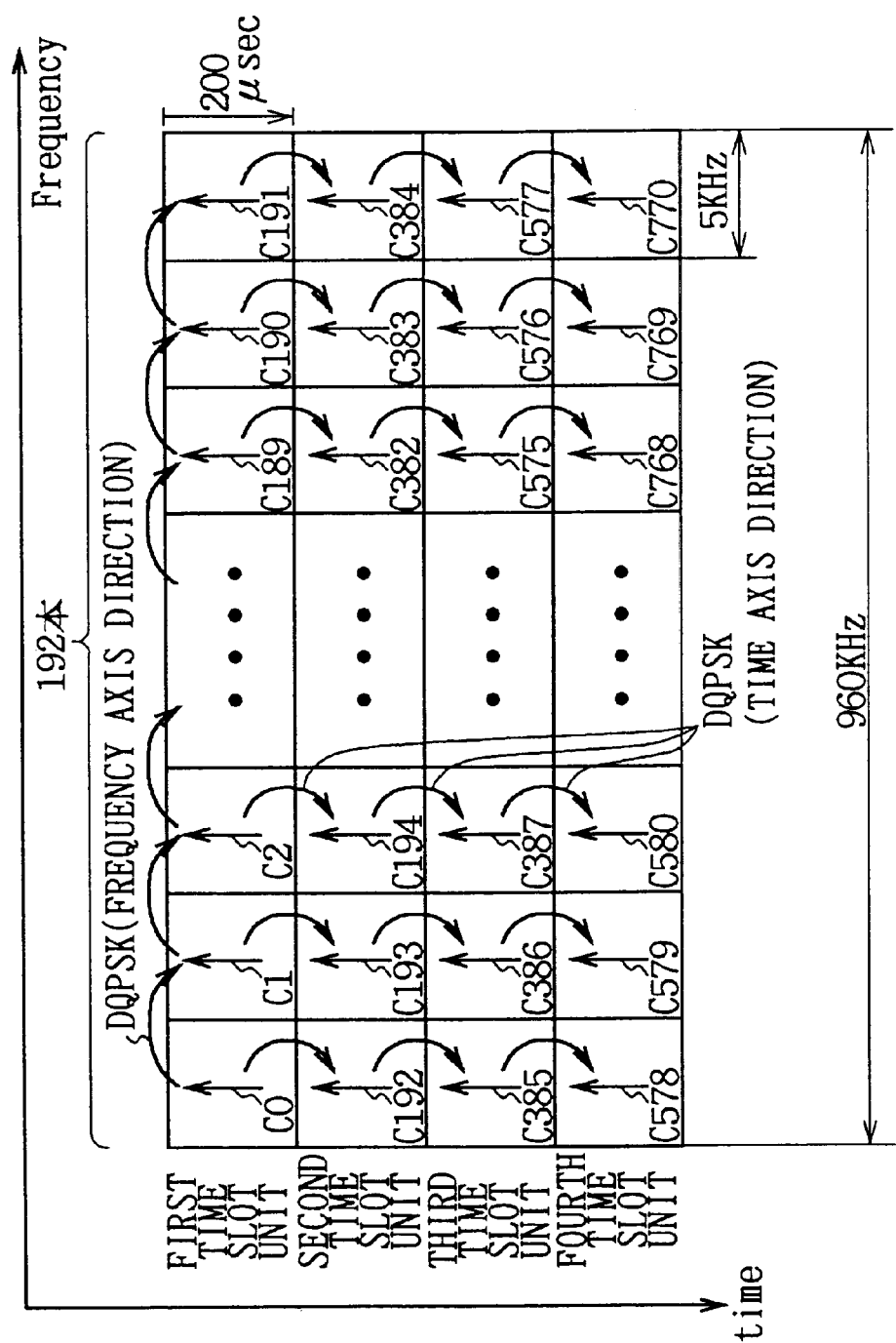
FIG. 7 is a diagram showing a modulation patterning method.

That is, in the communication system of the present invention, the ratio that the differential modulation process in the frequency axis direction is performed is increased in the communication environment where high-speed movement is primarily performed, and the ratio is increased in the communication environment where the influence of the frequency-selective fading caused by waveforms delayed by reflections from buildings or mountains is large (modulation pattern shown in FIG. 7). Therefore, in the state in which data degradation during transmission has been minimized according to communication environment, transmission can been performed.

Also, in the modulation pattern shown in FIG. 7, the differential modulation process in the frequency axis direction is performed when the first time slot unit is processed, while the differential modulation process in the time axis direction is performed when the second time slot unit and the time slot unit thereafter are processed. With this, the number of reference carriers can be reduced only to a single subcarrier C0. Therefore, since the wasteful reference carrier having no meaning as symbol data can be constituted by a single subcarrier C0, it becomes possible to enhance transmission efficiency in transmitting a data bit series which has a large amount of data.

From such a point of view, a description will hereinafter be made with reference to the case where, in the communication system of the present invention, the differential modulation process in the frequency axis direction is performed on the first time slot unit and also the differential modulation process in the time axis direction is performed when the second time slot unit and the time slot unit thereafter are processed.

(2) Constitution of a Transmitter

Figures 1A, 1B:
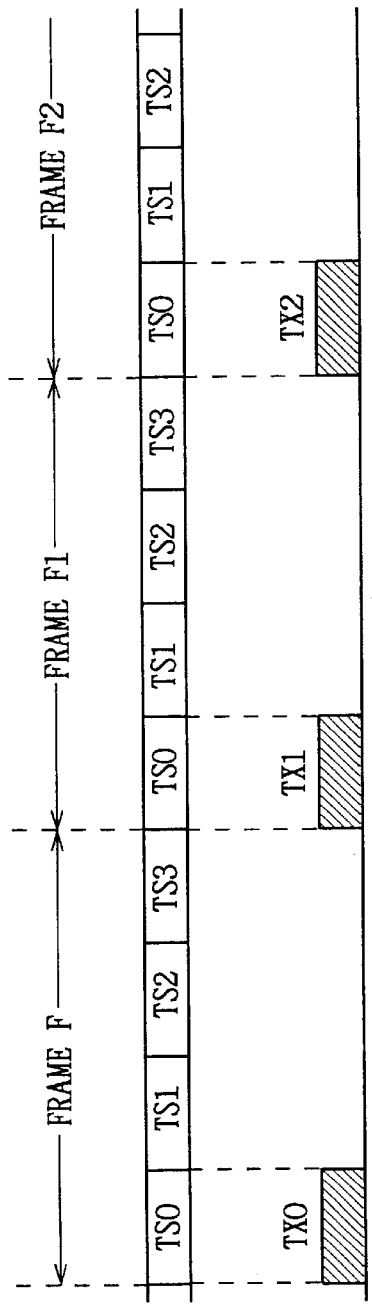
FIGS. 1A and 1B are diagrams showing the principle of a conventional TDMA system.
Figure 2:
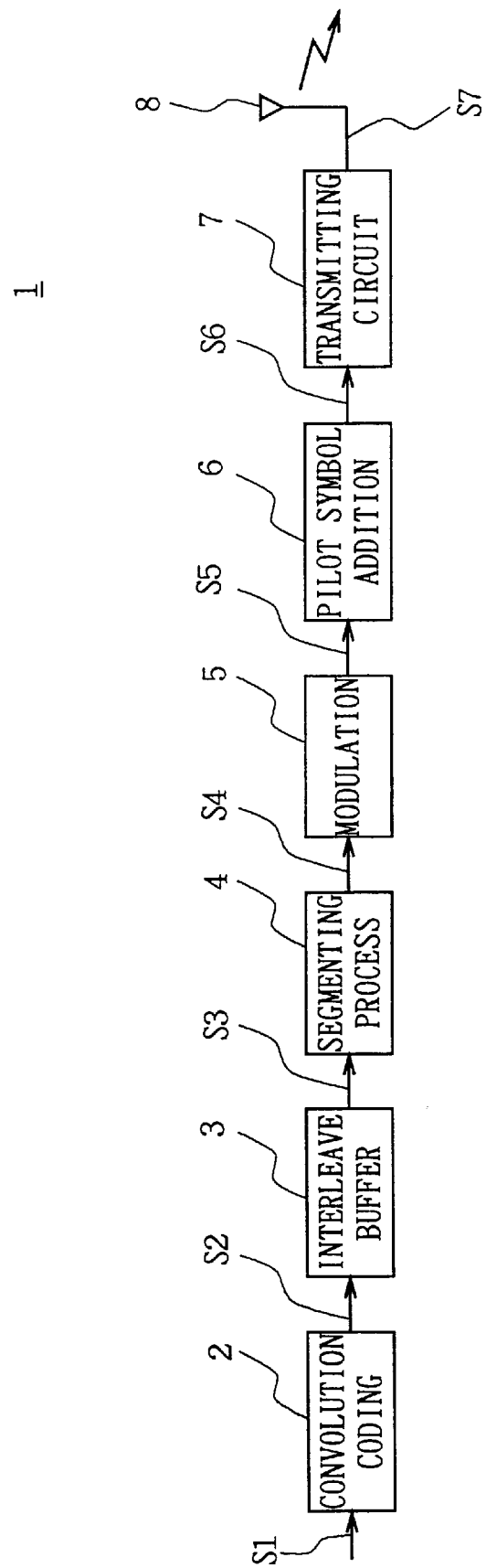
FIG. 2 is a block diagram showing the constitution of a conventional transmitter.
Figure 8:
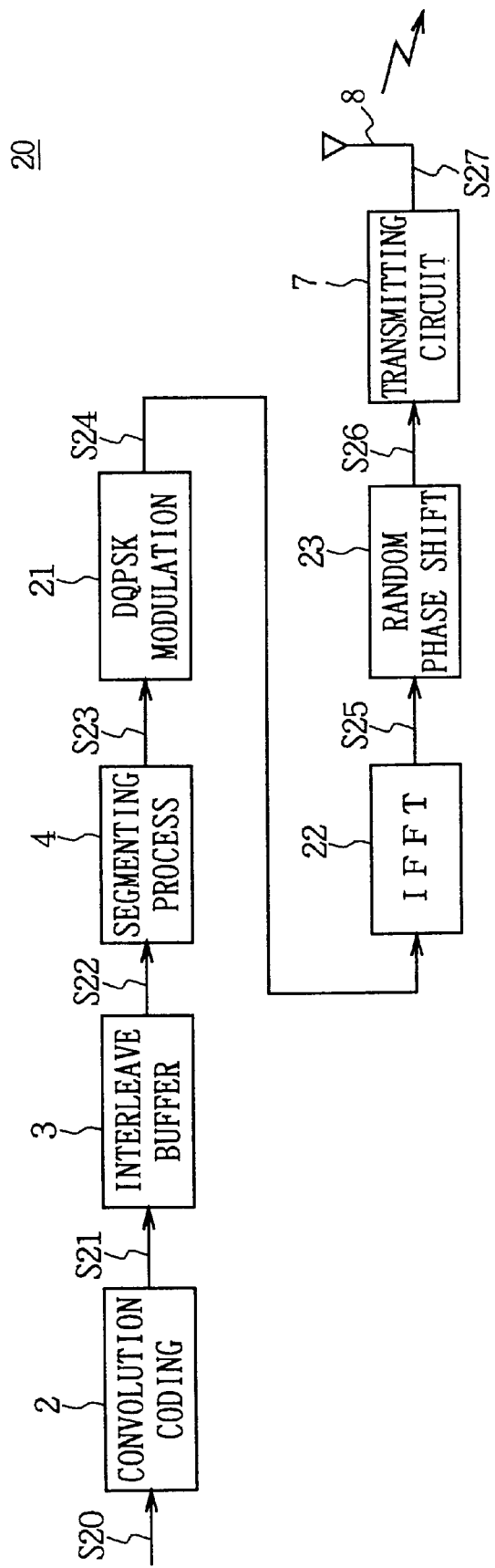
FIG. 8 is a block diagram showing the constitution of a transmitter.

In FIG. 8 in which the same reference numerals are applied to parts corresponding to FIG. 2, reference numeral 20 generally denotes a transmitter, which performs a differential modulation process by the above-mentioned system. Data bit series S20 is first input to a convolution coding circuit 2.

The convolution coding circuit 2 consists of a predetermined stage-number of shift registers and exclusive OR circuits. The convolution coding circuit 2 performs convolution coding on the input data bit series S20 and outputs the resulting coded bit series S21 to an interleave buffer 3.

The interleave buffer 3 stores the coded bit series S21 in its internal storage region in sequence. If the coded bit series S21 is stored in the entire storage region (i.e., if the coded bit series S21 is accumulated a desired amount), then the coded bit series S21 will be interleaved. The resulting coded bit series S22 is output to a segmenting circuit 4. Incidentally, the interleave buffer 3 has a storage capacity equivalent to a plurality of slots so that the coded bit series S21 is dispersed to a plurality of transmission slots TX.

The segmenting circuit 4 segments the coded bit series S22 every a predetermined number bits to allocate the coded bit series S22 to transmission slots TX. The resulting coded bit group S23 is output to a DQPSK modulation circuit 21 in sequence. Here, the coded bit group S23 allocated to the transmission slots TX is equivalent to the data amount that is transmitted by one data block.

The DQP SK modulation circuit 21 performs a DQPSK modulation process on the coded bit group S23 in accordance with a predetermined ratio at which the differential modulation processes in the frequency axis and time axis directions are performed and with a predetermined modulation pattern, thereby generating a transmission signal in which symbol data are represented by phase values. The predetermined ratio and modulation pattern are previously determined by a control section (not shown). The DQPSK modulation circuit 21 performs a π/4 shift DQPSK modulation process (in which the maximum phase change is suppressed to ±3π/4 by shifting the phase change in the previous symbol by π/4).

That is, the DQPSK modulation circuit 21 performs the differential modulation process in the frequency axis direction on the coded bit group S23, because symbol data are allocated to the phase differences between the subcarriers C0 to C191 in the first time slot unit in the data block. The DQPSK modulation circuit 21 also performs the differential modulation process in the time axis direction on the coded bit group S23, because symbol data are allocated to the phase differences between the subcarriers in the second time slot unit and the time slot units thereafter. The resulting data symbol group S24 is output to an inverse fast Fourier transformation (IFFT) circuit 22.

Figure 9:
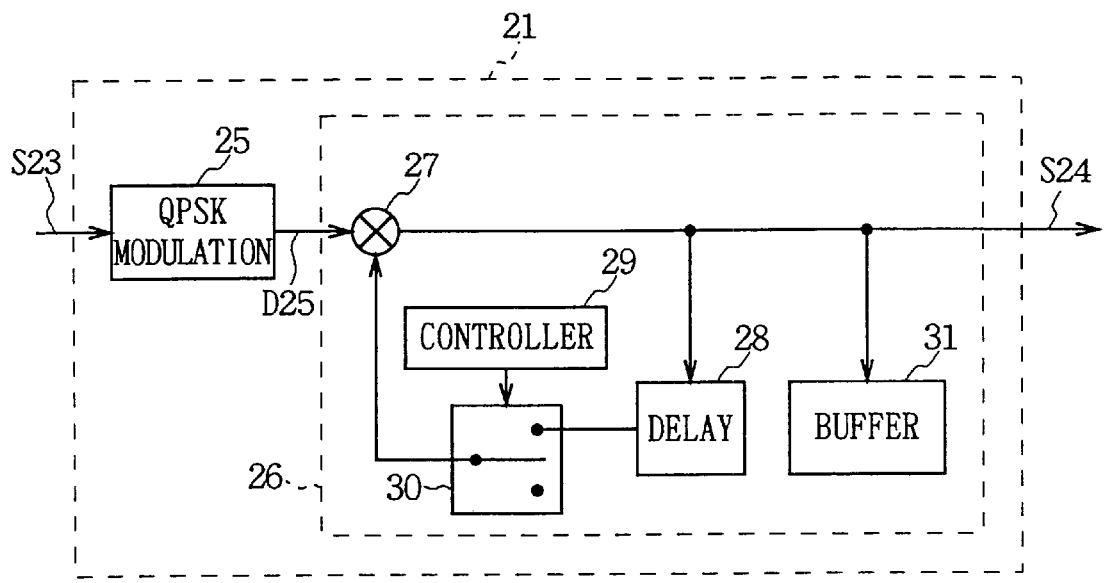
FIG. 9 is a block diagram showing the constitution of a DQPSK modulation circuit.

Here, the circuit constitution of the DQPSK modulation circuit 21 will be described with FIG. 9. The DQPSK modulation circuit 21 is constituted by a QPSK modulation circuit 25 and a differential modulation circuit 26. The QPSK modulation circuit 25 performs a QPSK modulation process on the code bit group S23 in sequence, thereby generating a transmission symbol stream D25 in which 2-bit data are mapped on a symbol. This stream is output to the multiplier 27 of the differential modulation circuit 26

The differential modulation circuit 26 inputs the transmission symbol prior to one symbol, obtained from the transmission symbol stream D25 through a delay circuit 28, to the multiplier 27 through a switch circuit 30 which is switched by a controller 29. The transmission symbol prior to one symbol and the currently input transmission symbol are multiplied by the multiplier 27. With this, the differential modulation circuit 26 performs differential modulation on symbol data, based on the phase difference between the currently input transmission symbol and the transmission symbol prior to one symbol. This modulation process is reiterated for each of the 192 transmission symbols to generate symbol data group S24. The symbol data groups S24 are output to the IFFT circuit 22.

Also, the differential modulation circuit 26 inputs the 192 transmission symbols in the first time slot unit stored in the buffer 31 to the multiplier 27 one by one through the switch circuit 30, and multiplies the 192 transmission symbols in the first time slot unit and the currently input 192 transmission symbols in the second time slot unit, thereby performing the differential modulation process in the time axis direction. The resulting symbol data group S24 is output to the IFFT circuit 22. Furthermore, the differential modulation circuit 26 performs the differential modulation process in the time axis direction on the third time slot unit and the time slot unit thereafter in a similar manner. The resulting symbol data group S24 is output to the IFFT circuit 22.

The IFFT circuit 22 performs an inverse fast Fourier process when all symbol data in the first time slot unit in the data symbol group S24 are input, thereby superposing the symbol data on each phase difference between the subcarriers C0 to C191. Likewise, the IFFT circuit 22 performs an inverse fast Fourier process when 192 symbol data in the second time slot unit or the time slot units thereafter are input, thereby superposing the symbol data of the data symbol group S24 on each phase difference between the subcarriers adjacent to each other in the time axis direction.

The IFFT circuit 22 also performs a window process on the transmission signal S25 generated by performing the inverse Fourier transformation process. With this, an unnecessary spurious output is suppressed. Note that the window process can be realized by passing the transmission signal S25 through a cosine roll-off filter in the time axis direction. The transmission signal S25, generated by the IFFT circuit 22, is input to a random phase shift circuit 23.

The random phase shift circuit 23 adds random phase values to the phases of a plurality of subcarriers forming the transmission signal S25, thereby making the phases of the plurality of subcarriers random. The random phase values are generated by a predetermined rule with an initial phase value as reference. The resulting transmission signal S26 is output to a subsequent transmitting circuit 7.

The transmitting circuit 7 first performs a filtering process on the transmission signal S26, then performs a digital-analog conversion process on the transmission signal S26, and performs a frequency transformation process. As a result, a transmission signal S27 with a predetermined frequency channel is generated. After this generated signal has been amplified to a predetermined electric power, the amplified signal is transmitted through an antenna 8. Note that the transmitting circuit 7 performs a so-called frequency hopping (FH) process in which the frequency channel to be used for each data block is randomly changed based on a predetermined hopping pattern. With this process, the influence of an interference waveform caused by other communications is reduced.

Thus, in the transmitter 20, by performing the DQPSK modulation processes in the frequency axis and time axis, directions on the coded bit group S23 at a predetermined ratio and then performing an inverse fast Fourier transformation process, symbol data are superposed on the phase differences between a plurality of subcarriers. After a predetermined transmission process has been performed, the processed symbol data are transmitted as a transmission signal S27.

(3) Constitution of a Receiver

Figure 3:
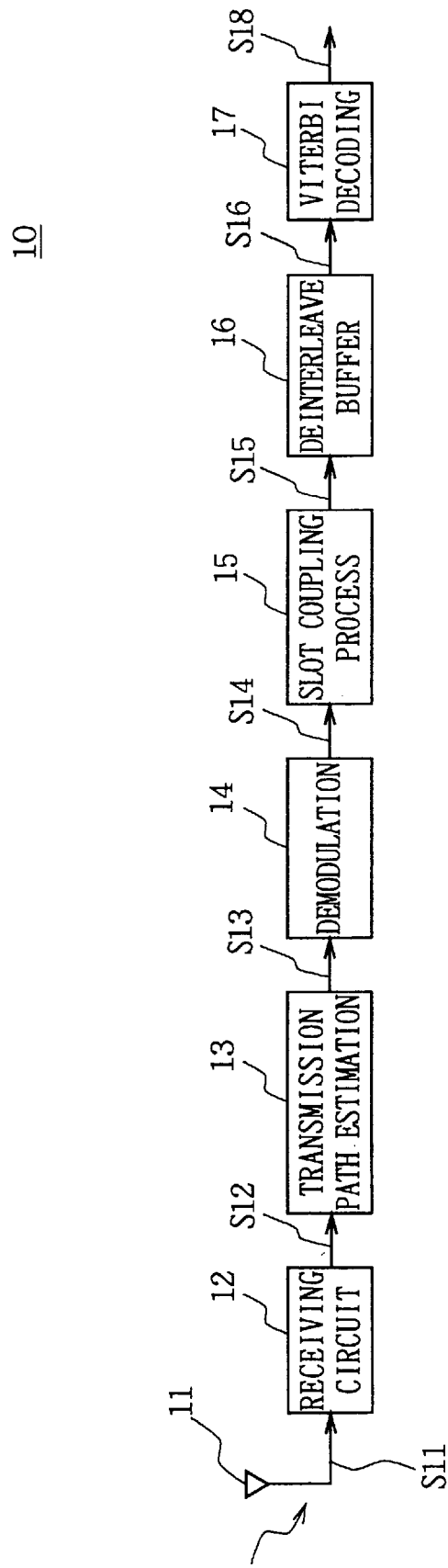
FIG. 3 is a block diagram showing the constitution of a conventional receiver.
Figure 4:
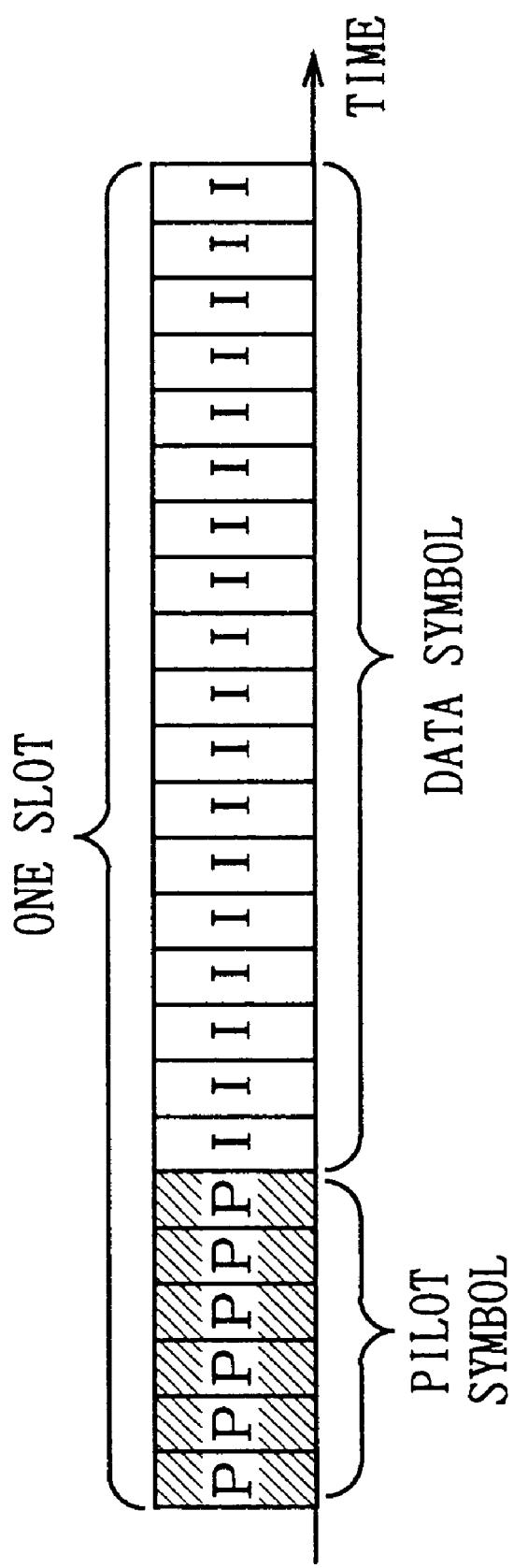
FIG. 4 is a diagram showing the arrangement of conventional pilot symbols.
Figure 11:
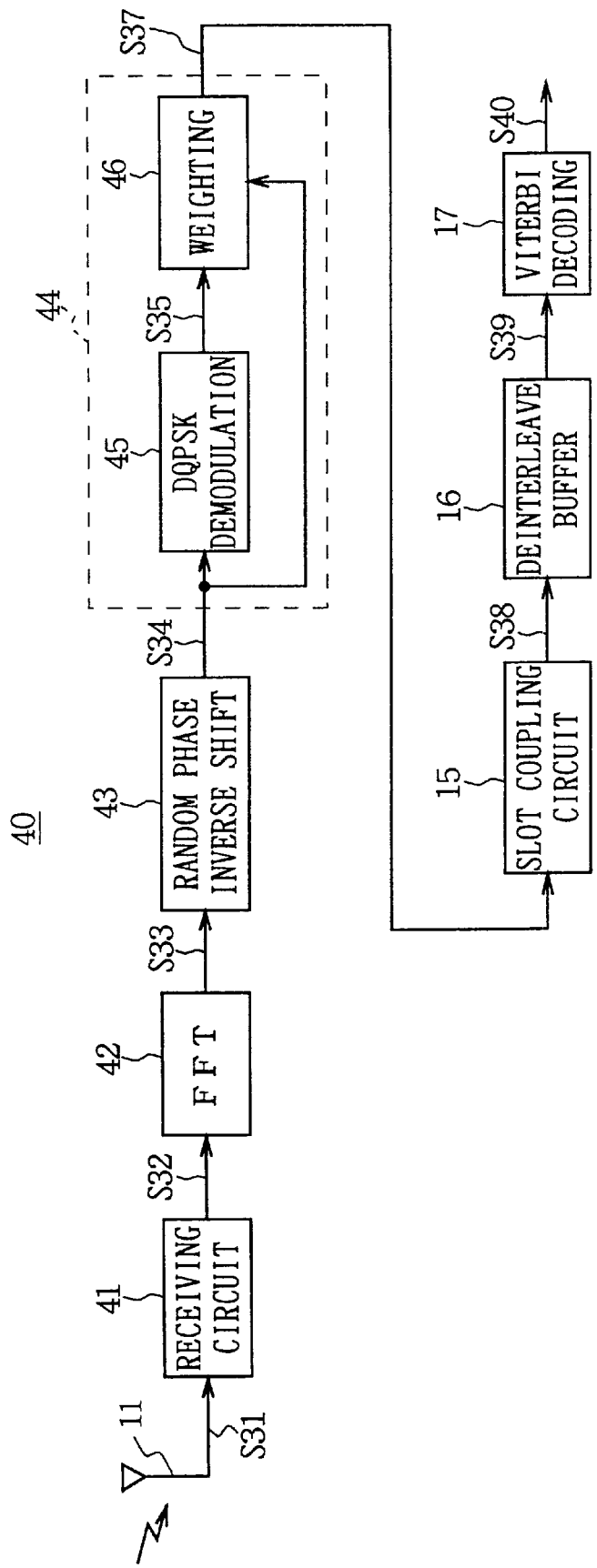
FIG. 11 is a block diagram showing the constitution of a DQPSK demodulation circuit.

On the other hand, in FIG. 11 in which the same reference numerals are applied to parts corresponding to FIG. 3, reference numeral 40 generally denotes a receiver. The receiver 40 is roughly constituted by an antenna 11, a receiving circuit 41, a fast Fourier transformation circuit (FFT) 42, a random phase inverse shift circuit 43, a demodulation circuit 44, a slot coupling circuit 15, a deinterleave buffer 16, and a Viterbi decoding circuit 17. The receiver 40 has almost the same constitution as the receiving circuit 10 shown in FIG. 3, except that the fast Fourier transformation circuit 42 and the random phase inverse shift circuit 43 are newly added instead of the transmission path estimating circuit 13 and that the processing contents of the receiving circuit 41 and demodulation circuit 44 are changed.

First, the antenna 11 receives the transmission signal S27 transmitted from the transmitter 20, and this is input to the receiving circuit 41 as a received signal S11. The receiving circuit 41 amplifies the input received signal S31 and then performs a frequency transformation on the received signal S31, thereby taking out a base band signal. The receiving circuit performs a filtering process on the base band signal and then performs an analog-to-digital conversion process on the base band signal, thereby taking out a received signal S32. This signal is output to the fast Fourier transformation circuit (FFT) 42.

The fast Fourier transformation circuit 42 performs a window process on the input received signal S32, thereby taking out the signal components equivalent to the first time slot unit by an amount equivalent to a total of four time slot units. A Fourier transformation is performed on these signal components. With this, the fast Fourier transformation circuit 42 takes out the symbol data superposed on the phase differences between a plurality of subcarriers. The symbol data are output to the random phase inverse shift circuit 43 as a received signal S33.

The random phase inverse shift circuit 43 returns the phase state of the received signal S33 to the original state by employing the same phase value as the transmitting side, and outputs the resulting received signal S34 to a subsequent demodulation circuit 44.

The demodulation circuit 44 is constituted by a DQPSK demodulation circuit 45 and a weighting circuit 46, and outputs the received signal S34 to both the DQPSK demodulation circuit 45 and the weighting circuit 46. The DQPSK demodulation circuit 45, as with the transmitting side, performs the differential demodulation process in the frequency axis direction on the received signal S34 on which the differential modulation process in the frequency axis direction was performed, and also performs the differential demodulation process in the time axis direction on the received signal S34 on which the differential modulation process in the time axis direction was performed. This resulting received symbol S35 is output to the weighting circuit 46.

Figure 10:
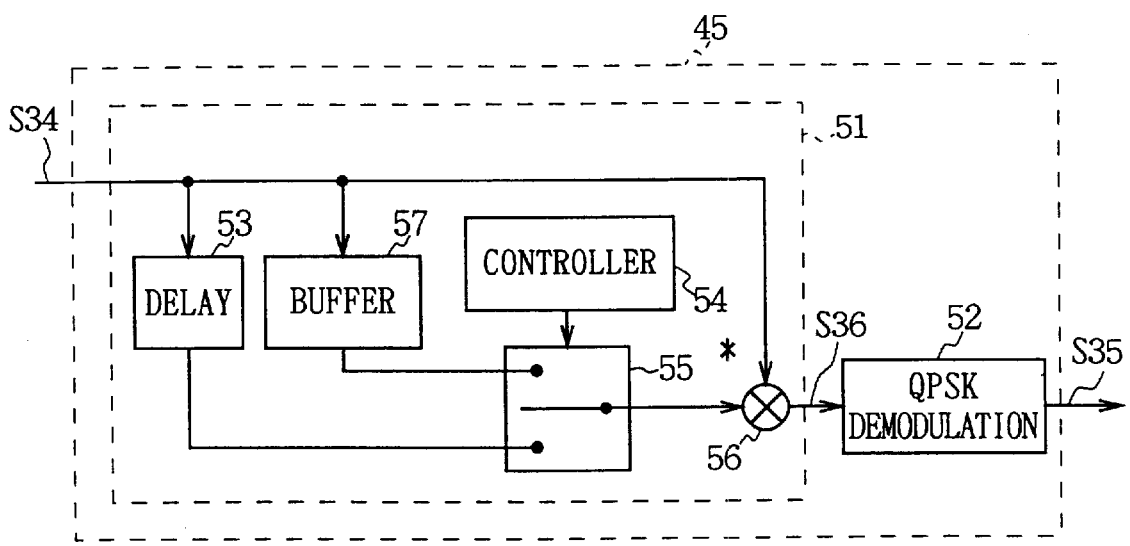
FIG. 10 is a block diagram showing the constitution of a receiver.

Here, the circuit constitution of the DQPSK demodulation circuit 45 will be described with FIG. 10. The DQPSK demodulation circuit 45 is constituted by a differential demodulation circuit 51 and a QPSK demodulation circuit 52. The differential demodulation circuit 51 inputs the received signal S34 delayed by one symbol, which is obtained through a delay circuit 53 from the input received signal S34, to a multiplier 56 through a switch circuit 55 which is switched by a controller 54. By complex multiplying a value which is conjugate with the received signal S34 delayed by one symbol and the currently input received signal S34 by the multiplier 56, the differential demodulation process in the frequency axis direction is performed to take out the received symbols S36 equivalent to the first time slot unit from the received signal S34. The received symbols S36 are output to the QPSK demodulation circuit 52.

The differential modulation circuit 51 also inputs the symbols of the received signal S34 of the first time slot unit prior to one transmission time, stored in the buffer 57, to the multiplier 56 one by one through the switch circuit 55. By complex multiplying the input symbol and each symbol of the currently input received signal S34 of the second time slot unit, the differential demodulation process in the time axis direction is performed. The resulting received symbols S36 are output to the QPSK demodulation circuit 52. Furthermore, the differential demodulation circuit 51 likewise performs the differential demodulation process in the time axis direction on the third time slot unit and the time slot unit thereafter. The resulting received symbols S36 are output to the QPSK demodulation circuit 52.

The QPSK demodulation circuit 52 performs a QPSK demodulation process on the received symbols S36 obtained by the differential demodulation processes in the frequency axis and time axis directions. The resulting received symbols S35 are output to the weighting circuit 46.

The weighting circuit 46 computes reliability in the data block (which is the data unit of communication data) for each data block, based on the received signal S34, and also computes a weighting coefficient according to the reliability. And the weighting circuit 46 multiplies the weighting coefficient and the received symbol S35 together for each data block, thereby reflecting the data block reliability in the signal level of the received symbol S35. The resulting received symbols S37 are output to a slot coupling circuit 15.

In this case, the weighting circuit 46 computes a mean value for computing reliability in a data block unit based on a large amount of sample data, whereby an error in the reliability can be reduced. Therefore, a weighting coefficient can be computed more accurately.

The slot coupling circuit 15 is one which couples symbols S37 separately received in a data block unit so that they become a series signal. If the received symbols S37 are accumulated by an amount corresponding to the storage capacity of the deinterleave buffer 16 of the latter stage, then the received symbols S37 will be coupled together. The coupled received symbol group S38 is output to the deinterleave buffer 16.

The deinterleave buffer 16 has a storage capacity equivalent to a plurality of slots. The deinterleave buffer 16 stores the received symbol group S38 in its internal storage region in sequence and then rearrange the order of the received symbol group S38 in the order opposite the rearrangement made by the interleave buffer 3 of the transmitter 20, thereby returning the arrangement to the original order. The resulting data bit stream S39 is output to a Viterbi decoding circuit 17.

The Viterbi decoding circuit 17 consists of a soft judgment Viterbi decoding circuit. The Viterbi decoding circuit 17 performs maximum likelihood estimation on the input data bit stream S39, thereby restoring a data bit series 40 transmitted from the transmitting side. In this case, the weighting circuit 46 of the first stage has computed data block reliability and multiplied the received symbol S35 and a weighting coefficient representing the data block reliability. For this reason, the data bit stream 39 input to the Viterbi decoding circuit 17 has a signal level corresponding to the data block reliability.

Therefore, even in the case where communication quality differs from data block to data block, if the data bit stream S39 with a signal level in which the communication quality is reflected by reliability is input to the Viterbi decoding circuit 17, then the Viterbi decoding circuit 17 will perform maximum likelihood estimation based on reliability of each slot. Therefore, the Viterbi decoding circuit 17 performs maximum likelihood estimation even more accurately and is able to restore the data bit series S40 even more accurately.

(4) Operation and Advantages

In the aforementioned constitution, the transmitter 20 performs transmission by implementing both the differential modulation process in the frequency axis direction which is robust to the influence of flat fading or frequency-selective fading caused by time variations during high-speed movement and the differential modulation in the time axis direction which is robust to the influence of frequency-selective fading caused by delayed waveforms, at a ratio predetermined within one data block. At this time, the transmitter 20 can superpose symbol data on the phase differences in the frequency axis and time axis directions between subcarriers, whereby the transmission efficiency of communication data can be raised as the entire data block.

With this, even in the case where the influence of frequency-selective fading caused by delayed waveforms is large or the case where the influence of fading caused by time variations during high-speed movement, if the differential modulation processes in the frequency axis and time axis directions are performed at a predetermined ratio according to the communication environment being used, the transmitter 20 can efficiently reduce data degradation resulting from fading caused on the transmission path.

Also, in the transmitter 20, in actual fact the differential modulation process in the frequency axis direction is performed on the first time slot unit of the data block, while the differential modulation process in the time axis direction is performed on the second time slot unit and the time slot units thereafter. Therefore, as in the case where the differential modulation process in the time axis direction is performed on the entire data block, all subcarriers in the first time slot unit are employed as reference carriers for the subcarriers in the second time slot unit, and in addition to this, the symbol data can also be superposed on the phase differences in the frequency axis direction between the subcarriers in the first time slot unit. Therefore, more symbol data can be transmitted as a whole of one data block.

Furthermore, in the transmitter 20, in actual fact a symbol with phase 0 and amplitude 1 (which has no meaning as symbol data) is allocated to the reference carrier C0 in the first time slot unit, and based on this symbol with phase 0 and amplitude 1, symbol data is superposed on the phase difference with the symbol of the subcarrier C adjacent in the frequency direction. Also, symbol data is superposed on the phase difference in the time axis direction between the reference carrier C0 and the symbol of the subcarrier C192 in the second time slot unit. Therefore, if an unnecessary phase rotation occurs due to noise added to the symbol of the reference carrier C0, then an unnecessary phase offset will occur between adjacent subcarrier C1 and symbol of the subcarrier C192 and therefore data degradation will occur when the differential modulation process is performed.

However, symbol data is superposed on the phase difference, so even if an unnecessary phase rotation occurs due to noise added to the symbol of the reference carrier C0, the subcarrier C1 and the symbol of the subcarrier C192 can be employed as a subsequent reference carrier if no phase rotation occurs between the subcarrier C1 and the symbol of the subcarrier C192.

Therefore, as in the present invention, in the case where a differential modulation method of superposing symbol data on a phase difference is employed, when the symbol of the reference carrier C0 is influenced by noise, etc., only the symbol data, superposed on the phase differences between the symbol of the reference carrier C0 and the symbols of the adjacent subcarriers C1 and C192, are influenced and therefore data degradation will occur. Since the other symbol data are not subjected to the influence, data degradation can be reduced accordingly.

In addition, the receiver 40 receives the transmission signal S27 on which the differential modulation processes in the frequency axis and time axis directions were performed at a predetermined ratio according to communication environment, 50 that reception can be performed while in the state in which data degradation occurring on the transmission path has been reduced. By performing the differential demodulation process in the frequency axis direction on the received signal S34 on which the differential modulation process in the frequency axis direction was performed at the transmitting side and also by performing the differential demodulation process in the time axis direction on the received signal S34 on which the differential modulation process in the time axis direction was performed, symbol data are restored. With this, the data bit series S40 can be restored more accurately.

Furthermore, in the receiver 40, by computing a weighting coefficient in order to reflect reliability in communication quality for every data block and then multiplying the weighting coefficient and the received symbol S35, even in the case where communication quality differs from data block to data block, the communication quality is reflected in the signal level by reliability so that the data bit series S40 can be restored even more accurately because of the addition of reliability for every data block.

According to the aforementioned constitution, both the differential modulation process in the frequency axis direction and the differential modulation process in the time axis direction are performed within one data block at a predetermined ratio according to communication environment at the transmitting side. With this, the influence of fading caused by the transmission path can be reduced according to communication environment. Accordingly, a transmission signal in a state of less data degradation can be efficiently transmitted. At the receiving side, the original data bit series can be restored more accurately by performing the differential demodulation processes in the frequency axis and time axis directions in the same manner as the transmitting side.

(5) Another Embodiment

In the above-mentioned embodiment, while it has been described that the differential modulation process in the frequency axis direction is performed on the first time slot unit, the present invention is not limited to this but the differential modulation process in the frequency axis direction can be performed on any time slot unit.

Also, in the above-mentioned embodiment, while it has been described that the data block, which consists of four time slot units in time axis direction each constituting a band slot unit consisting of 192 subcarriers arranged in the frequency axis direction, is constituted as a data unit, the present invention is not limited to this but the data block can be constituted by various numbers of subcarriers and time slot units.

Figure 12:
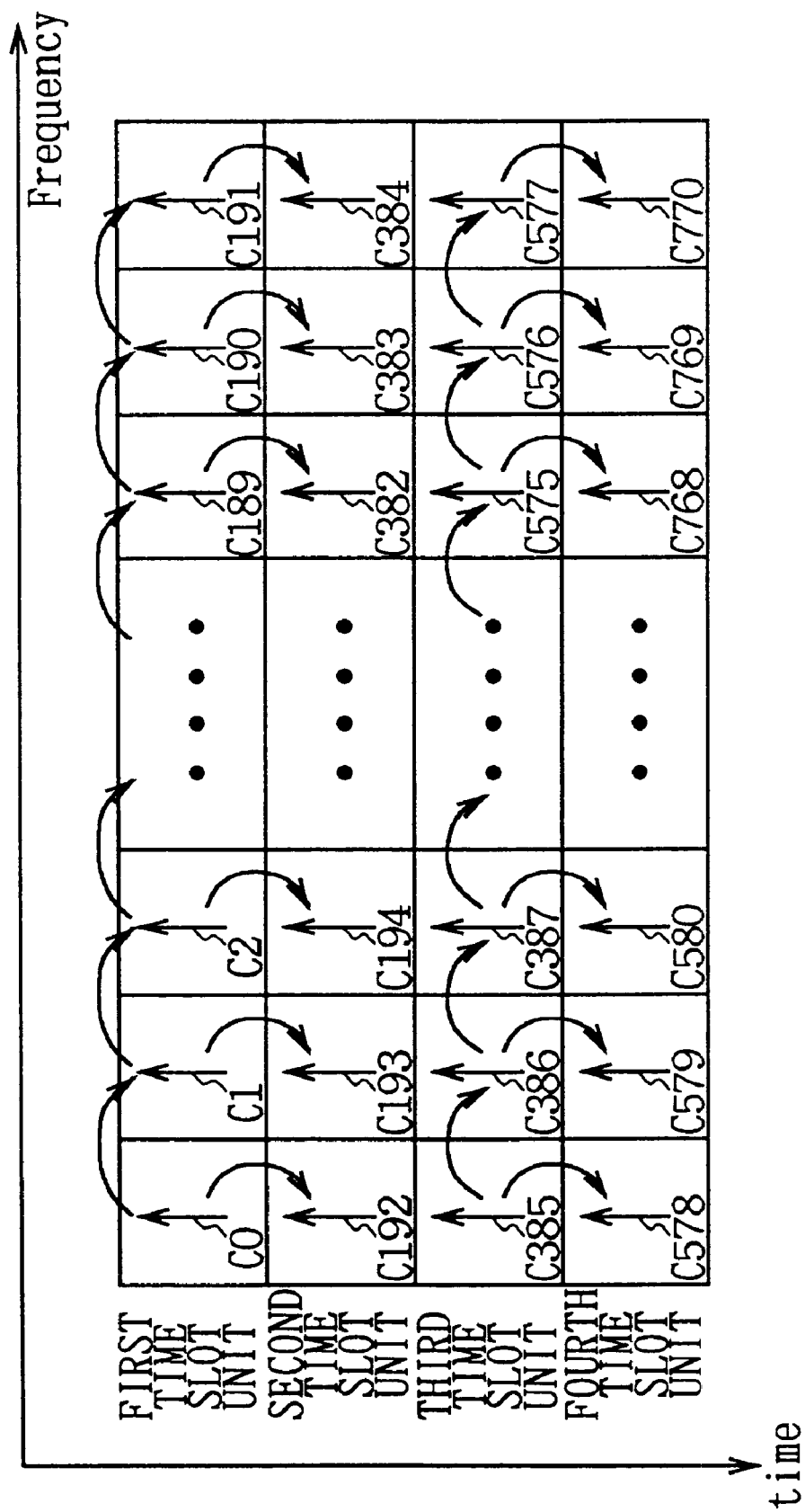
FIG. 12 is a diagram showing a modulation pattern according to another embodiment.

Furthermore, in the above-mentioned embodiment, while it has been described that the differential modulation process in the frequency axis direction is performed on the first time slot unit and that the differential modulation process in the time axis direction is performed on the second through the fourth time slot units, the present invention is not limited to this. As shown in FIG. 12, the differential modulation process in the frequency axis direction and the differential modulation process in the time axis direction can be alternately performed. Thus modulation patterns consisting of various combinations may be employed.

In this case, the differential modulation processes in the frequency axis direction and in the time axis direction are alternately performed. Even under communication environment where only waveforms delayed by the multipath occur or communication environment which is used only at the time of high-speed movement, half of data can be restored without degradation. In addition, in the mobile station and base station of a cellular system, if a differential modulation process is performed using the same modulation pattern, this modulation pattern can be employed as a cryptograph and therefore secrecy can be enhanced.

Furthermore, in the above-mentioned embodiment, although it has been described that weighting is performed in the unit of a data block, the present invention is not limited to this. In the communication environment where communication data and voice data exist within the same cell, weighting can be performed in the unit of a slot (24 subcarriers) which is the data unit of voice data. Even in the communication environment where only communication data is transmitted and received within the same cell, when the characteristic of frequency-selective fading describes a gentle curve which does not considerably change as the entire data block, weighting can be finely performed in the unit of one slot which is the minimum unit of the data block.

Moreover, in the above-mentioned embodiment, although it has been described that a DQPSK modulation process is performed by the DQPSK modulation circuit 21 (modulation means) and that the transmission signal S27 is generated and transmitted by the FFT circuit 22 and transmitting circuit 7 (transmission means), the present invention is not limited to this. Modulation means employing various modulation methods, such as 8PSK or 16PSK, can be employed, so long as they are a method of superposing symbol data on a phase difference.

As described above, in the present invention, by implementing at the transmitting side both the differential modulation process in the frequency axis direction having a characteristic robust to fading caused by time variations at the time of high-speed movement and the differential modulation process in the time axis direction having a characteristic robust to fading caused by waveforms delayed due to the multipath, even in the case where fading results from time variations at the time of high-speed movement or from waveforms delayed due to the multipath during transmission, data degradation caused by the fading can be reduced because transmission is performed after the differential modulation processes having respective characteristics have been implemented. Thus, at the receiving side, communication data can be accurately restored by implementing differential demodulation processes in the frequency axis and time axis directions as in the transmitting side. Therefore, such a data communication method can be realized according to the present invention.

Also, in accordance with the present invention, by implementing both the differential modulation process in the frequency axis direction having a characteristic robust to fading caused by time variations at the time of high-speed movement and the differential modulation process in the time axis direction having a characteristic robust to fading caused by waveforms delayed due to the multipath, even in the case where fading results from time variations at the time of high-speed movement or from waveforms delayed due to the multipath during transmission, data degradation caused by the fading can be reduced because transmission is performed after the differential modulation processes having respective characteristics have been implemented. Therefore, such a transmitter can be realized according to the present invention.

Furthermore, in accordance with the present invention, by implementing at the mobile station both the differential modulation process in the frequency axis direction having a characteristic robust to fading caused by time variations at the time of high-speed movement and the differential modulation process in the time axis direction having a characteristic robust to fading caused by waveforms delayed due to the multipath, even in the case where fading results from time variations at the time of high-speed movement or from waveforms delayed due to the multipath during transmission, data degradation caused by the fading can be reduced because transmission is performed after the differential modulation processes having respective characteristics have been implemented. Thus, at the base station, communication data can be accurately restored by implementing differential demodulation processes in the frequency axis and time axis directions as in the mobile station. Therefore, such a cellular radio communication system can be realized according to the present invention.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A data transmitting method which transmits communication data by using a plurality of subcarriers arranged within a predetermined frequency width, said data transmitting method wherein a data block consisting of said plurality of subcarriers arranged in rows in a time axis direction is used as a data unit when said communication data is transmitted, and both a differential modulation process based on each phase difference in a frequency axis direction between said plurality of subcarriers and a differential modulation process based on each phase difference in the time axis direction between said plurality of subcarriers are implemented, whereby a transmission signal that symbol data of said communication data are superposed on each phase difference between said plurality of subcarriers is generated and output.

2. The data transmitting method according to claim 1, wherein a ratio that said differential modulation process in the frequency axis direction and said differential modulation process in the time axis direction are implemented is arbitrarily set according to communication environment.

3. The data transmitting method according to claim 1, wherein said differential modulation process based on each phase difference in the frequency axis direction between said plurality of subcarriers is first implemented and then said differential modulation process based on each phase difference in the time axis direction is implemented.

4. A data receiving method which receives communication data transmitted by using a plurality of subcarriers arranged within a predetermined frequency width, said data receiving method wherein:

a data block consisting of said plurality of subcarriers arranged in rows in a time axis direction is used as a data unit when said communication data is transmitted, and both a differential modulation process based on each phase difference in a frequency axis direction between said plurality of subcarriers and a differential modulation process based on each phase difference in the time axis direction between said plurality of subcarriers are implemented, whereby a transmission signal that symbol data of said communication data are superposed on each phase difference between said plurality of subcarriers is received; and differential demodulation processes based on each phase difference in the frequency axis and time axis directions are implemented on said received signal, whereby said symbol data superposed on each phase difference between said plurality of subcarriers are demodulated and said communication data are restored.

5. The data receiving method according to claim 4, wherein a ratio that said differential modulation process in the frequency axis direction and said differential modulation process in the time axis direction arc implemented is arbitrarily set according to communication environment, so as to generate said transmissions signal.

6. The data receiving method according to claim 4, wherein said differential modulation process based on each phase difference in the frequency axis direction between said plurality of subcarriers is first implemented and then said differential modulation process based on each phases difference in the time axis direction is implemented, so as to generate said transmission signal.

7. A data transmitter which transmits communication data by using a plurality of subcarriers arranged within a predetermined frequency width, said data transmitter comprising:

modulating means, which uses a data block consisting of a plurality of subcarriers arranged in rows in a time axis direction as a data unit when said communication data is transmitted, for implementing both a differential modulation process based on each phase difference in a frequency axis direction between said plurality of subcarriers and a differential modulation process based on each phase difference in the time axis direction between said plurality of subcarriers, whereby a transmission signal that symbol data of said communication data are superposed on each phase difference between said plurality of subcarriers is generated; and transmitting means for transmitting said transmission signal through a predetermined frequency channel.

8. The data transmitter according to claim 7, wherein, said modulating means implements the differential modulation process in the frequency axis direction and the differential modulation process in the time axis direction with a predetermined ratio according to communication environment.

9. The data transmitter according to claim 7, wherein said modulating means implements the differential modulation process based on each phase difference in the frequency axis direction between said plurality of subcarriers first, and then implements the differential modulation process based on each phase difference in the time axis direction.

10. A data receiver which receives communication data transmitted by using a plurality of subcarriers arranged within a predetermined frequency width, said data receiver comprising:

receiving means, which uses a data block consisting of said plurality of subcarriers arranged in rows in a time axis direction as a data unit when said communication data is transmitted, for implementing both a differential modulation process based on each phase difference in a frequency axis direction between said plurality of subcarriers and a differential modulation process based on each phase difference in the time axis direction between said plurality of subcarriers, whereby a transmission signal that symbol data of said communication data are superposed on each phase difference between said plurality of subcarriers is received; and demodulating means for implementing differential demodulation processes based on each phase difference in the frequency axis and time axis directions on said received signal received by said receiving means, whereby said symbol data superposed on each phase difference between said plurality of subcarriers are demodulated and said communication data is restored.

11. The data receiver according to claim 10, wherein a ratio that said differential modulation process in the frequency axis direction and said differential modulation process in the time axis direction are implemented is arbitrarily set according to communication environment, so as to generate said transmission signal.

12. The data receiver according to claim 10, wherein said differential modulation process based on each phase difference in the frequency axis direction between said plurality of subcarriers is first implemented and then said differential modulation process based on each phase difference in the time axis direction is implemented, so as to generate said transmission signal.

13. A cellular radio communication system in which a predetermined area is segmented into cells with a predetermined size, then a base station is deployed in each of the cells, and a mobile station communicates communication data with said base station where that mobile station exists, said cellular radio communication system wherein:

at said mobile station, a data block consisting of a plurality of subcarriers arranged in rows in a time axis direction is used as a data unit when said communication data is transmitted, and both a differential modulation process based on each phase difference in the frequency axis direction between said plurality of subcarriers and a differential modulation process based on each phase difference in the time axis direction between said plurality of subcarriers are implemented, whereby a transmission signal that symbol data of said communication data are superposed on each phase difference between said plurality of subcarriers is generated and output;

at said base station, said transmission signal is received, and differential demodulation processes in the frequency axis and time axis directions are implemented on said received signal, whereby said symbol data superposed on each phase difference between said plurality of subcarriers are demodulated and said communication data is restored.

14. The cellular radio communication system according to claim 13, wherein said mobile station arbitrarily sets a ratio that the differential modulation process in the frequency axis direction and the differential modulation process in the time axis direction are implemented according to communication environment.

15. The cellular radio communication system according to claim 13, wherein said mobile station implements the differential modulation process based on each phase difference in the frequency axis direction between said plurality of subcarriers first, and then implements the differential modulation process based on each phase difference in the time axis direction.

\* \* \* \* \*